(12) United States Patent
Sarradin

(10) Patent No.: US 6,832,718 B2
(45) Date of Patent: Dec. 21, 2004

(54) SMART CARD PAYMENT TERMINAL

(75) Inventor: Jean-Louis Sarradin, Fontenay en Parisis (FR)

(73) Assignee: Sagem SA, Paris (FR)

(*) Notice: Subject to any disclaimer, the term of this patent is extended or adjusted under 35 U.S.C. 154(b) by 0 days.

(21) Appl. No.: 10/169,031

(22) PCT Filed: Dec. 20, 2000

(86) PCT No.: PCT/FR00/03620
§ 371 (c)(1),
(2), (4) Date: Sep. 12, 2002

(87) PCT Pub. No.: WO01/48707
PCT Pub. Date: Jul. 5, 2001

(65) Prior Publication Data
US 2003/0052162 A1 Mar. 20, 2003

(30) Foreign Application Priority Data
Dec. 23, 1999 (FR) .............................. 99 16422

(51) Int. Cl.[7] ................................................ G06K 5/00
(52) U.S. Cl. ........................ 235/380; 235/486; 235/492
(58) Field of Search ........................ 235/380, 375–376, 235/379, 382.5, 441, 476, 486, 492, 382, 436; 340/10.41, 144; 379/144; 705/35, 39, 40, 41, 42, 64, 75

(56) References Cited

U.S. PATENT DOCUMENTS 5,387,784 A * 2/1995 Sarradin ..................... 235/380
5,811,770 A    9/1998 Bonnemoy
5,909,485 A * 6/1999 Martin et al. ............. 379/114.2
5,933,812 A * 8/1999 Meyer et al. .................. 705/15
6,094,640 A * 7/2000 Goheen .......................... 705/5
6,105,006 A * 8/2000 Davis et al. ................... 705/35
6,131,718 A * 10/2000 Witschorik .................. 194/206
6,142,369 A * 11/2000 Jonstromer ................. 235/380
6,161,012 A * 12/2000 Fenton et al. ............ 455/432.2
RE37,067 E * 2/2001 Feiken ....................... 235/380
6,278,863 B1 * 8/2001 Mabrouki ................... 455/63.1
6,285,879 B1 * 9/2001 Lechner et al. .......... 455/432.3
6,311,167 B1 * 10/2001 Davis et al. ................... 705/35
6,359,881 B1 * 3/2002 Gerszberg et al. .......... 370/354
6,434,385 B1 * 8/2002 Aucoeur ..................... 455/430
6,577,229 B1 * 6/2003 Bonneau et al. ......... 340/10.41

FOREIGN PATENT DOCUMENTS

| EP | 0940783 A | 9/1999 |
|---|---|---|
| EP | 0965938 A | 12/1999 |
| FR | 2778302 A | 11/1999 |
| WO | WO 9908238 A | 2/1999 |
| WO | WO 0022582 A | 4/2000 |

* cited by examiner

Primary Examiner—Thien M. Le
Assistant Examiner—Edwyn Labaze
(74) Attorney, Agent, or Firm—Patterson, Thuente, Skaar & Christensen, P.A.

(57) ABSTRACT

A chip-card payment terminal is capable of being connected both to a base station of a mobile telephony network and to a base station of a private telephony network. A transmission mode selection means provide for preference being given to transmission with the private telephony network because the price scale of these communications is lower.

8 Claims, 2 Drawing Sheets

SMART CARD PAYMENT TERMINAL

BACKGROUND OF THE INVENTION

An object of the present invention is a terminal for payment by chip cards that can be used chiefly by tradesmen, especially tradesmen who have to travel frequently.

A standard chip-card payment terminal comprises a chip-card reader linked with a keyboard, a display screen, a transmission means (normally a modem) and a microprocessor that manages the interconnection between the different peripherals.

A payment operation with a terminal of this kind is carried out as follows. A bank type chip card belonging to a customer is inserted into the slot of the reader of the terminal. During this session, the bearer of the chip card is asked to key in a secret identification PIN code on the keyboard of the terminal. This secret code is sent on to the chip card which ascertains that the keyed-in secret code corresponds to an expected secret code. Furthermore, other security operations may be undertaken. They may concern especially the authentication of the chip card by the reader as well as the authentication of the reader by the chip card. These authentication operations enable each of the two units respectively to verify that the unit with which they are linked is an authentic unit and not a falsified one.

Once these preliminary operations have been performed, or prior to their performance, the payment terminal is used to key in a payment message. This payment message comprises essentially an indication of an amount, an indication of the identity of the debiting party and an indication of the identity of a creditor. The indication of the amount is keyed in by the tradesman through the keyboard, preferably before the verification operation. Consequently, the operation of verifying the holder of the chip card is equivalent, at the same time, to consent to payment. The fact of keying in his secret code becomes, in itself, an act of consent to make payment. The identity of the debiting party is taken, especially during the preliminary verification operations, from the chip card. The indication of the debiting party may relate to a serial number of his chip card. This number is used by a financial institution to retrieve his bank account number. Or else, this identity is the bank account number itself, encrypted or non-encrypted, with or without matching consistency codes. The creditor tradesman's identity is taken normally from the payment terminal given to the tradesman by his financial institution. With these three pieces of information, and if the secret code is correctly keyed in, the terminal prepares the payment message. In practice, this message is a numerical sequence, at least stored in a working memory of the terminal.

Once the payment message has been prepared, the terminal can send it to a payment-message collection circuit of its financial institution. This sending operation is done by a modem contained in the terminal. The sending operation may be done in real time or in deferred time. It is done in real time when the amount of the transaction is above a limit or when the type of chip card of the debiting party inserted into the reader requires it or for any other reason, for example when the number of transactions performed with the reader becomes greater then a certain number. When the sending is done in real time, the financial institution transmits a return message that takes account of the payment or refuses to take account of payment. This taking-into-account message is enciphered and stored in correspondence with the payment message in a storage memory of the terminal. For message-sending operations in deferred time, generally done at night, all the payment messages collected during the day by a payment terminal are transmitted to the financial organization which executes them, without any possibility of rejection.

On the whole, payment by chip card provides great security to the creditor. Such a creditor therefore naturally tends to prefer payments made in this way to any other form of payment, possibly even payment in cash because then there is no risk of his being robbed of the sums paid to him.

When a tradesman is traveling, it is provided that the modem will be replaced by an instrument capable of getting linked up to the financial institution by means of a mobile telephony network. The working of a mobile terminal of this kind is then similar to that of the standard chip-card payment terminal, except that the transmission is done by a mobile telephony network. The information exchanged in this case is exchanged in a data mode, or even by means of SMS (Short Message Service) transmissions.

However, this mode of transmission has one drawback. Indeed, In addition to the price of the mobile terminal itself, the cost of mobile telephony communications is high. Even if the calls are short, they lead to a substantial increase in the tradesman's working expenses.

To resolve this problem of cost, such a tradesman will then have to acquire not only his mobile terminal but also a fixed terminal connected to the switched telephone network through which he can make transactions when he is in his shop. In certain businesses, the cost of the terminal, whose technology changes frequently, is a hardly acceptable burden, especially if two of them have to be purchased. Furthermore, for companies using the services of a traveling agent, the double machines increases with the number of their agents.

OBJECTS AND SUMMARY OF THE INVENTION

The invention resolves this problem of cost by providing for a mobile terminal capable of choosing a mode of transmission from a selection of at least two possible mode of transmission. A first possible transmission mode is then a mode using a mobile telephony network, the other mode being a transmission mode that uses the switched telephone network and is less costly. In a preferred version, to carry out the transmission by the switched telephony network, which is a public network, the payment terminal will be associated with a private base station. In this case, the mobile terminal will be capable of sending out radio transmissions to the public mobile telephony network when it cannot send out radio transmissions to its private base station. In particular in this case, the mobile terminal will be a terminal compliant with a DECT type standard and will be provided, in particular, with every improvement available to instruments of this type.

These improvements will comprise especially the automatic selection of a preferred transmission mode. This preferred mode could naturally be preferably the switched telephony mode for which the cost of transmission is low. The automatic selection can be done in a usual way by systematic interrogation from the base to find out if the mobile terminal is in its radio environment. If it is, the mobile terminal reports its presence to the base and the same time switches over its mode of use.

If need be, in modes of use known as the called Home Service modes, it may be planned that the mobile terminal will continue to use the mobile telephony network but at preferential price scales for payment message communications, these preferential price scales being quite comparable to the low price scales of the switched telephony network. In this case, the private base informs the mobile telephony network and/or the switched telephony network that it has diverted the calls sent to this mobile terminal to the switched telephony number or vice versa. Through this procedure, the instrument of the invention provides a dual service: it keeps the tradesman's private telephone line available while granting him the expected reduction in price scales.

An object of the invention therefore is a chip-card payment terminal comprising means to produce a payment message and means to transmit this payment message to a financial institution, characterized in that the transmitting means comprise means to select one transmission mode among several modes.

BRIEF DESCRIPTION OF THE DRAWINGS

The invention will be understood more clearly from the following description and from the appended figures. These figures are given purely by way of an indication and in no way restrict the scope of the invention. Of these figures.

DESCRIPTION OF THE PREFERRED EMBODIMENTS

Figure 1:
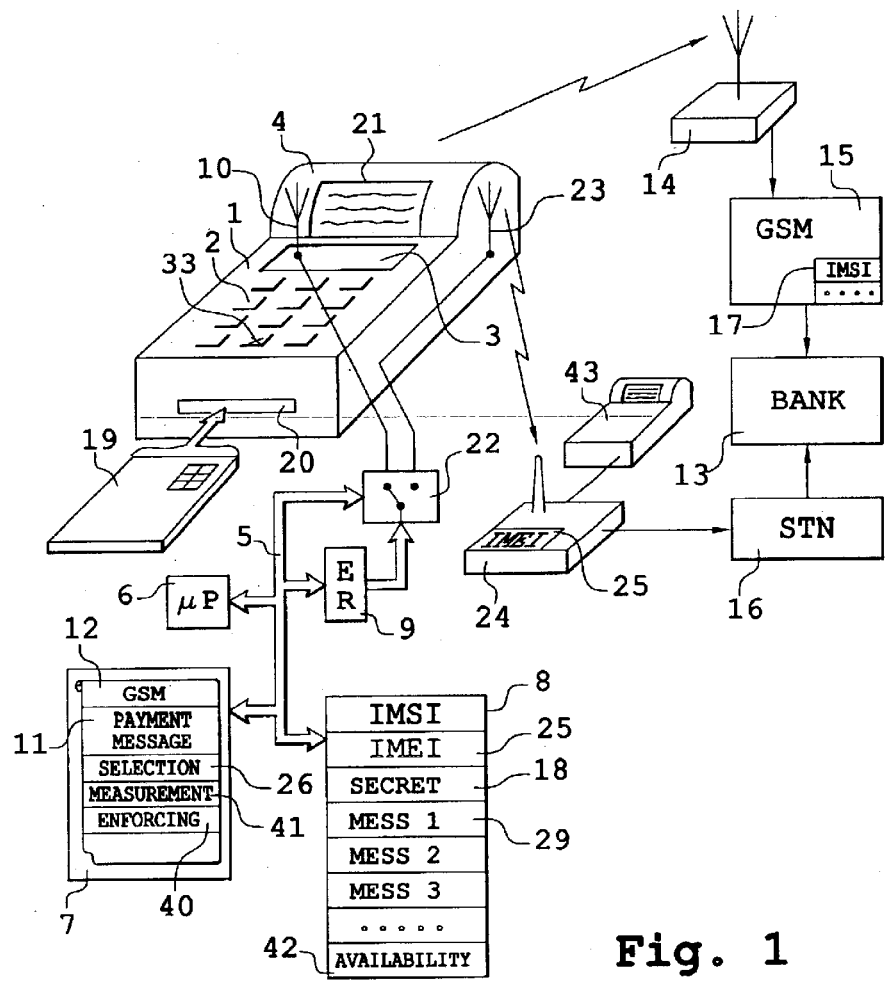
FIG. 1 is a diagrammatic view of the payment terminal of the invention and its environment used to obtain the preferred use.

FIG. 1 shows a chip-card payment terminal 1 according to the invention. This terminal 1 comprises chiefly a pack 1 provided, in a classic way, with a keyboard 2, a screen 3, a printer 4 connected together by means of the bus 5 to a microprocessor 6, a program memory 7 and a non-volatile data memory 8. A payment terminal of this kind, provided with radio sending/reception means 9, is known. These means 9 are connected to a sender antenna 10 symbolizing terminal stages of the sending/reception circuits 9. A payment terminal 1 of this kind is capable of issuing a payment message by means of a program 11 contained in the memory 7 and is capable of transmitting the payment messages by means of a transmission program 12 to the circuits of a financial institution 13. A radio transmission mode, especially in the context of a GSM (or Global System for Mobile communications) type of application, implies the participation of public base stations 14 with which the mobile terminal 1 may get linked up.

These base stations 14 are connected to a mobile telephony network 15. In practice, the link between the base stations 14 and the network 15 may use the lines of a switched telephony network 16. The public base stations 14 are characterized by the fact that a number known as the IMSI (international mobile subscriber identification) number is taken from the memory 8 of the mobile terminals that communicate with these public base stations, during the communications that they convey, and by the fact that these IMSI numbers are compared with the IMSI numbers stored in a memory 17 of the circuits of the network 15. This identification of IMSI subscription thus enables the management devices of the network 15 to carry communications from the mobile terminal 1, and above all to invoice the cost to the subscription holder.

At the practical level, the IMSI number, rather than being stored in a memory 8 of the terminal 1, may be stored in a complementary security circuit (not shown), in communication with the bus 5. In the context of chip-card payment mobile terminals 1, this subscription security circuit cooperates or is directly combined with a payment-message-issuing security circuit. This payment-message-issuing security circuit uses secret code zones 18 of the memory 8 for operations of verification, payment message acknowledgement and authentication.

In the prior art, a payment terminal of this kind works in expected way. A chip card 19 of a debiting customer is inserted into a reader 20 linked with the bus 5. The program 11 executed by the microprocessor 6 causes the payment operations to run and, at the end, activates a session of the program 12 to enter into communication with the circuits of the bank 13 by means of the base stations 14. The payment message is then processed, accepted or rejected as the case may be, and the base station 14 transmits to the terminal 1 which, by means of the printer 4, prints out a slip that represents the transaction and can be given to the customer.

In the invention, a different procedure is used. In the terminal 1, in the transmission channel, there is interposed a selection circuit 22 used to select a transmission mode. As is shown schematically, this selection circuit 22, at output of the sending/reception circuit 9, can implement another transmission circuit 23 symbolically represented by an antenna instead of the circuit 10. The circuit 23 tends to make the mobile terminal 1 link up with a private base station 24. A private base station 24 generally works like a public base station 14 linked up with a mobile telephony network 15.

In order that the terminal 1 may work with the private base station 24, during a preliminary association session (performed only once in the lifetime of the terminal 1), the mobile telephone 1 transmits its IMEI (International Mobile Equipment Identity) number 25 to the private base station 24. Clearly, this IMEI number characterizes the mobile terminal 1 far more than its holder's IMSI subscription with a mobile telephony network 15. During this association session, the mobile terminal 1 informs the private base station 24 that it is liable to be linked up with it. During this association session, the base station accepts the terminal as one of its possible partners. During communications between the terminal 1 and the private base station 24, this association leads to the setting up of communications protocols comprising operations of addressing, frequency designation, time-related synchronization, assigning of transmission power and so on. The private base station 24 is furthermore linked by means of the switched telephony network 16 with the services 13 of the financial institution to which the payment messages have to be conveyed. To this end, the private base station 24 may comprise a modem. The private base station 24 is classic in this respect.

Figure 2:
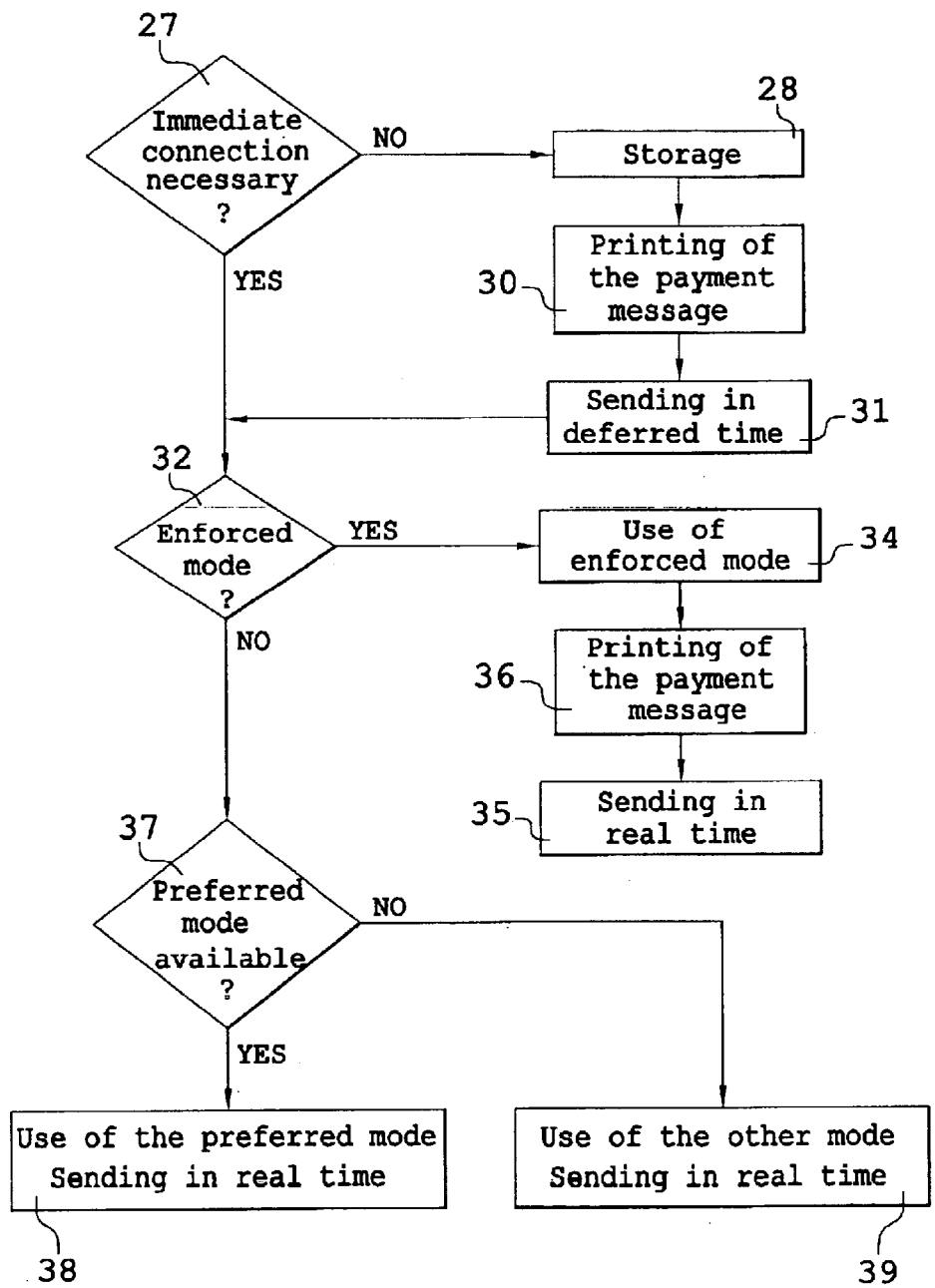
FIG. 2 is a flow chart of operations to be implemented in the payment terminal so that it can host all the facilities offered.

The essential feature of the invention therefore lies in the presence of the means 22 for the selection of the transmission mode. However, the means 22 are herein shown schematically. Indeed, FIG. 2 shows the preferred special characteristics of the issuing and transmission of a message with the terminal 1. When the terminal 1 is being used and when a payment message has been prepared in according to the program 1, a selection program 26, shown in FIG. 2, then includes a first test 27 to find out if the connection between the terminal 1 and the institution 13 is immediately necessary. This connection is immediately necessary if the amount of the transaction is greater than a limit or if the payment card 19 requires a verification of each operation.

If this immediate connection is not necessary, the program 26 launches a storage operation 28 and the payment message is stored at the location 29 of the memory 8 (or other memory). After this, or beforehand, the program 26 prompts a printing 30 of the payment message so that the debiting party can have a record of the amount that he has paid (even if he does not know that the payment message has not yet been transmitted to the bank). And operation 31 then takes place for sending the payment message in deferred time.

This operation of sending 31 in deferred time, or sending in real time if an immediate connection is needed, leads to a second test 32 during which the program 26 seeks to find out whether or not the terminal 1 is in enforced transmission mode. This enforced transmission mode may be obtained for example by pressing a special key 33 of the keyboard 2 or a combination of keys of the terminal. This enforced mode may also, of course, have been chosen beforehand in a menu for the use of the selection program 26, or even for the issuing of the payment messages 11. If an enforced mode has been imposed, this enforced mode will be used during a step 34 to send the payment message during a step 35 and, as the case may be, during a step 35 and possibly print the payment message in a step 36 if it has not already been printed in a step 30.

The enforced mode may be any mode whatsoever of the two modes: the transmission mode using the public mobile telephony network or the mode using the base station 24 and the switched telephony network 16. It is also possible to provide for an embodiment where the enforced mode can only be one of these modes, preferably the mode using the switched telephony network 16 with its lower transmission price scales. In this case, it could be impossible for this message to be transmitted if the mobile terminal 1 is at too great a distance from the base station 24. In this case, the steps 35 and 36 will not occur and a corresponding failure message will be displayed on the screen 3.

If the mode is not enforced, the program 26 again preferably provides for a test 37 during which a preferred mode of transmission may be chosen. For example, the preferred transmission mode may be the mode using the switched telephone network 16. Either this mode is available, and it is used during a step 38. The step 38, like the step 35 may be followed by a step for printing out the payment message if it has not yet been printed. If the test shows that the preferred mode of transmission is not available then, during a step 39, the other mode is used, or else one of the other modes if several other modes are planned.

The test 32 resulting from an enforced mode will result from the execution of a program 40 stored in the program memory 7. The test 37 will result from a program 41 for measuring the availability of the preferred transmission mode. This measurement 41 may comprise periodic sending operations by the base station 24 addressed to the terminal 1 and tending to refresh a piece of information 42 in this terminal, this piece of information 42 being an indication of availability of the link with the base station 24. Or else, the program 41 will possibly include an attempt to set up a communications link with the base station 24 and, if this attempt does not succeed, at the end of a time lag, the other mode could be preferred. In the event of an indication of availability with messages coming out of the base station 24, the program 41 may provide for a time lag for the cancellation of this information on availability if it is not refreshed with sufficient frequency. The messages exchanged to this end between the private base station 24 and the terminal 1 are of the type exchanged between a mobile telephone and a private base station, especially a DECT type mobile telephone in which the communications are digital communications. At the practical level, the measurement means 41 will correspond to a radio detectability of the presence of the terminal 1 in the environment of the private base station 24. This may be achieved by any other means, especially by action on a switch of the station 24, or even the depositing of the terminal 1 directly at the station 24.

When the call is not immediately necessary, the messages are stacked in the zone 29 of the memory 8. In this case, once the holder of the terminal 1 has come into the vicinity of the base station 24, he can prompt the sending operation 31 in deferred time by launching the test 32 and the rest of the operation described. In this case, the base station 24 may be linked with an auxiliary printer 43, unless the printer 4 plays this role, to inform it that the payment messages have effectively been transmitted to the bank 13.

In a Home Service type use, physically, the transmission mode remains the same the price-scale consequences change. From this viewpoint, the detection of the Home Service is, per se, another mode of transmission of the payment message.

What is claimed:

1. A chip card payment terminal comprising means for removably inserting a chip card into the terminal, means for producing a payment message, and means for transmitting the payment message to a financial institution, wherein the transmitting means comprise means for selecting one transmission mode from among two modes, wherein one mode of transmission is a mode of transmission on a public mobile telephony network and the other is a mode with a transmission to a public switched telephony network via a private mobile telephony network.

2. The terminal according to claim 1, wherein the means for selecting comprise means for measuring whether the terminal is in the area covered by a base station of the private mobile telephony network.

3. The terminal according to claim 2, wherein the measuring means comprise a radio detection of the position of the terminal with respect to the position of the private base station.

4. The terminal according to claim 1, wherein the means for selecting comprise means for enforcing one mode of transmission among the two modes.

5. The terminal according to claim 1, further comprising means for storing a plurality of payment messages when the terminal is in given mode of transmission and means for transmitting the stored messages in deferred time.

6. The terminal according to claim 5, wherein the means for transmitting in deferred time use a mode with transmission via the private mobile telephony network.

7. The terminal according to claim 1, further comprising means for securing the payment message.

8. The terminal according to claim 1, wherein the means for selecting comprise means for a perfect use of one of the transmission modes and for use of the other mode in an event of failure.

* * * * *